March 29, 1932. R. F. RUSSELL 1,851,525
CHUCK
Filed April 5, 1930 3 Sheets-Sheet 1
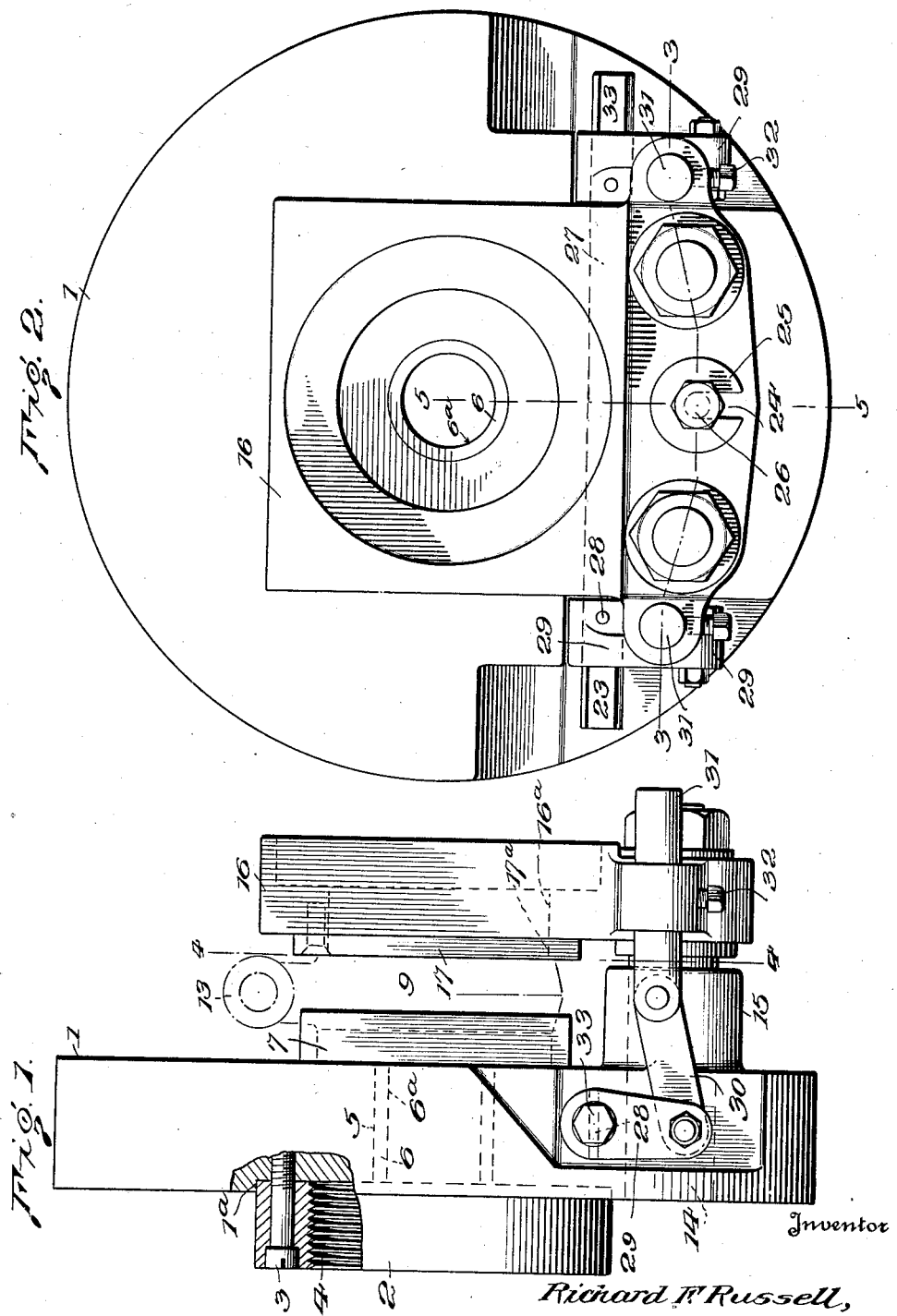
Inventor
Richard F. Russell,
Attorneys

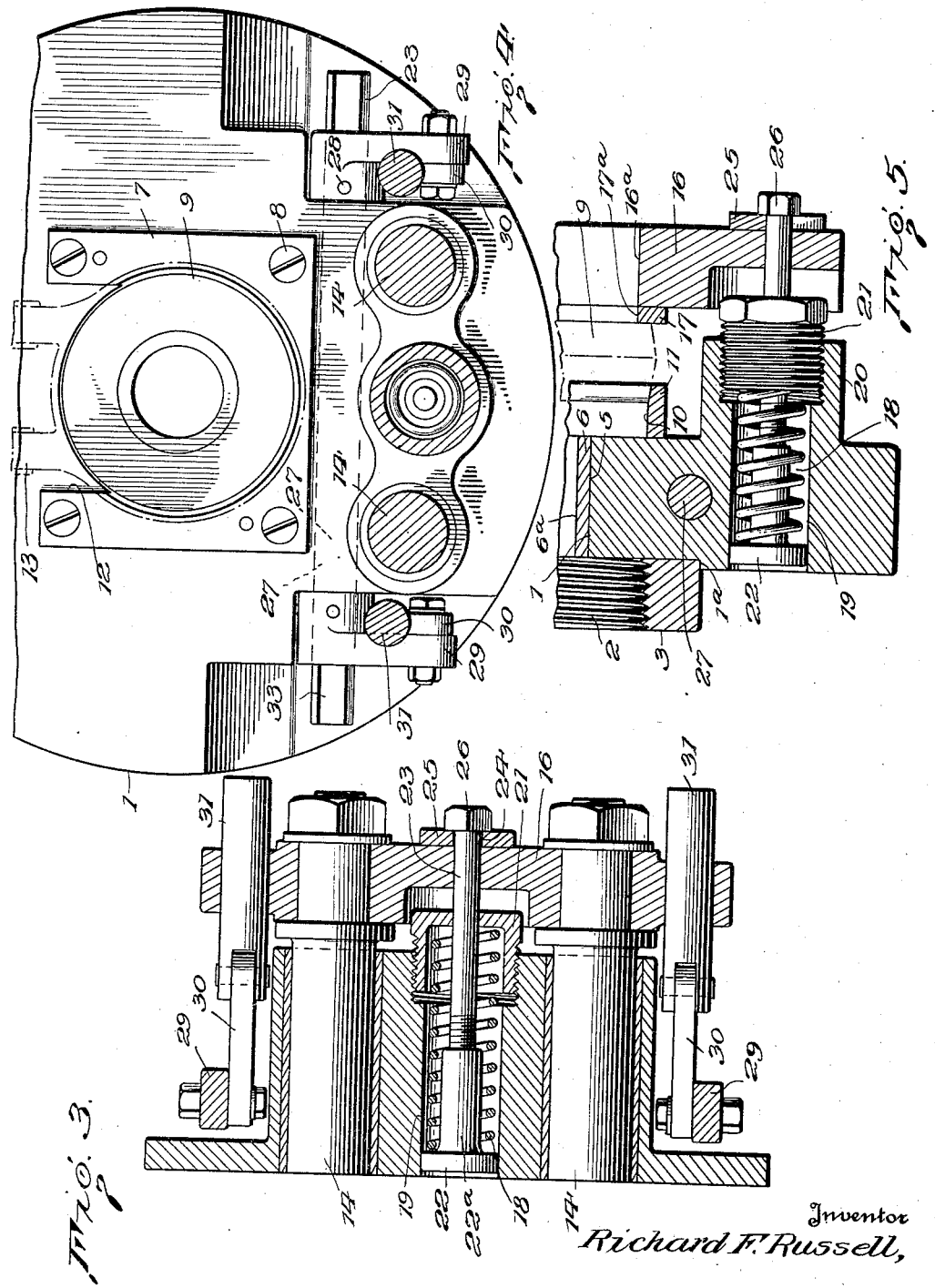

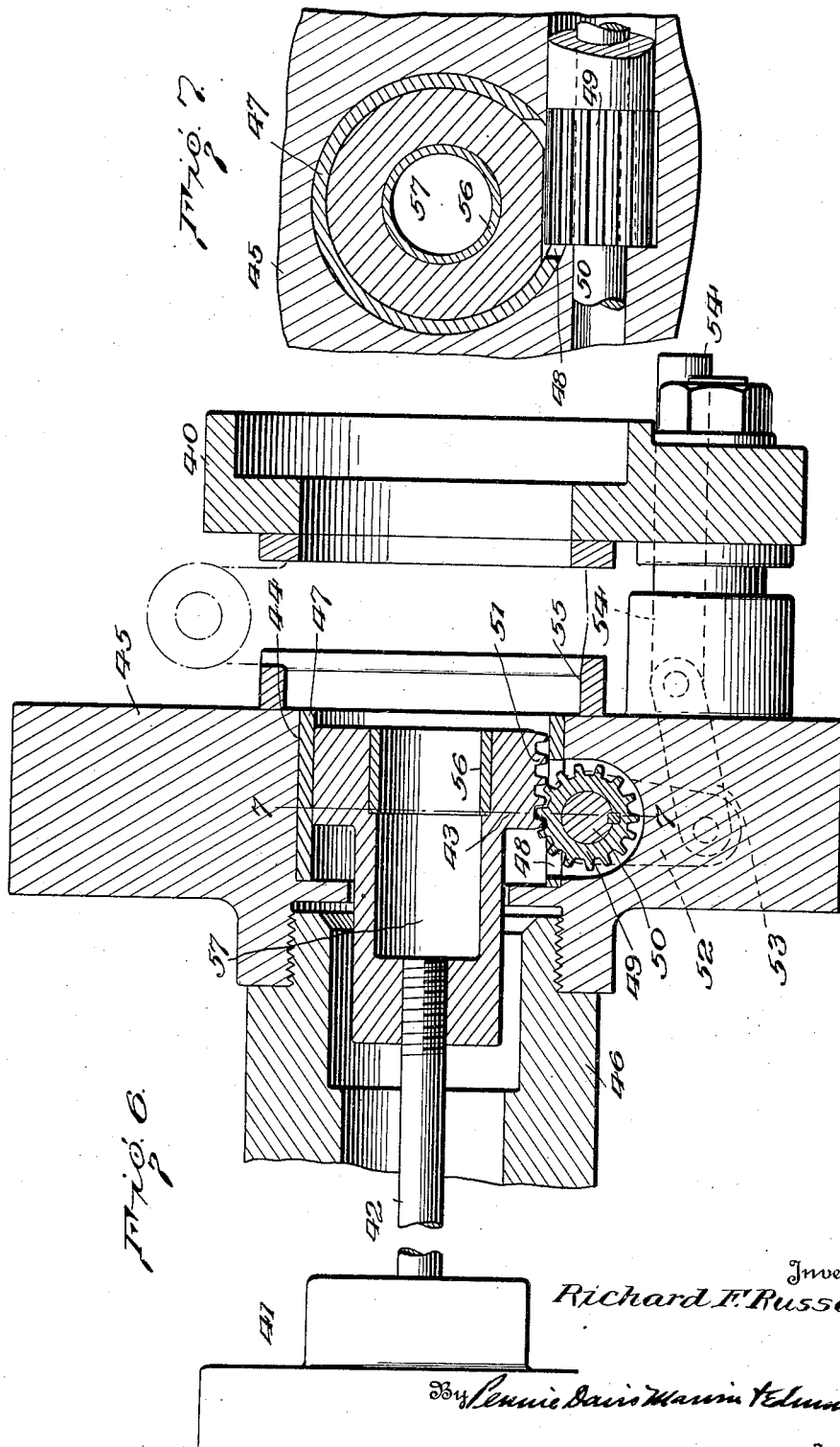

Patented Mar. 29, 1932

1,851,525

UNITED STATES PATENT OFFICE

RICHARD F. RUSSELL, OF ELMIRA, NEW YORK

CHUCK

Application filed April 5, 1930. Serial No. 441,883.

The present invention relates to a chuck assembly and particularly to a chuck for holding a radius rod strap end while the same is being bored, although it is to be understood that the chuck is adapted for holding other types of work upon which a machining operation is to be performed.

Radius rod strap ends are ordinarily drop forged, and have to be bored to bring the opening therein to a 0.002 inch limit. Heretofore, the practice has been to clamp them in a jaw chuck while they were being bored. However, a chuck of the jaw type is not entirely satisfactory for clamping such forgings while they are being bored, as the pressure of the jaws distort the forgings and, when released, the bored holes are frequently out of round to such an extent that the piece has to be thrown away. By the use of a positive pressure chuck the work may be suitably clamped in the machine upon which the machining operation is to be performed, without any danger whatever of the work being distorted, and the piece being naturally held will ensure that the holes when bored will be true and round.

It is an object of the present invention to provide a positive pressure chuck which will securely hold the work without distorting the same, and one which may be readily assembled and dismantled, so that it may be used to clamp work of various types and sizes. This may be accomplished by merely changing the pressure plate and a work-locating adapter which is made to fit and is special for each piece of work. Such a chuck never becomes obsolete through a change in the size or proportions of the work, and the replacement cost is thereby reduced to a minimum.

In carrying out the present invention I provide a chuck body which has one face provided with means for securing it to the machine upon which the machining operation is to be performed, and which carries on its other face a work-locating adapter for the particular work to be machined. This body is provided with a plurality of supporting members upon which a pressure plate is slidably mounted, and means are provided whereby the pressure plate may be slid upon the supporting members. Preferably the pressure plate is normally urged towards the chuck body to cause the work to be clamped between it and the work-locating adapter, and means are provided for sliding the pressure plate away from the chuck body to cause the work to be disengaged, whereby the same may be readily removed.

The means for causing the pressure plate to be slid away from the chuck body preferably comprises toggle means, connected to an operating shaft which passes through the chuck body and has each end suitably formed to be engaged by a tool for operating the same, so that the operation thereof may take place from either side of the machine. However, the toggle means may, in some cases, be replaced by a shaft having lifting cams, or by a rack and pinion, without spring pressure but with a positive locking eccentric pin lever, or such means of releasing and locking the movable pressure plate may take the form of fluid or air cylinders with pistons.

The invention is further illustrated in the accompanying drawings and description, wherein the chuck is shown as being adapted to clamp a radius rod strap end which is to be bored, but it is to be understood that the chuck is applicable for clamping other types of work and may be secured to lathes, milling machines, or grinders, of various types, where drilling, boring, reaming or grinding operations are to be performed upon the work, and where it is desired to hold the work without distortion. It is also to be understood that the further illustration and description is an exemplification of the invention, and that the same is not limited thereto except as set forth in the appended claims.

In the drawings:

Figure 1 is a side view of the chuck with a part thereof being shown in section;

Fig. 2 is an end view;

Fig. 3 is a horizontal sectional view on line 3—3 of Fig. 2;

Fig. 4 is a sectional view on line 4—4 of Fig. 1,

Fig. 5 is a detail sectional view on line 5—5 of Fig. 2;

Fig. 6 is a sectional view of a chuck wherein the pressure plate is operated by a fluid or air cylinder, and Fig. 7 is a section on line 7—7 of Fig. 6.

In the accompanying drawings, the chuck assembly is shown as being applicable for clamping a radius rod strap end while the same is being bored, and comprises a body or face plate 1, which has an adapter ring 2 secured to one face thereof so that the same may be readily secured to the machine in which the machining operation is to be performed, in the present instance a turret lathe. The adapter ring 2 will vary according to the type of machine to which it is to be attached, but in each case its outer periphery is formed to fit in the recess $1^a$ in the chuck body 1 and is secured therein by bolts 3, or other removable securing means, which are anchored in the chuck body. The adapter ring 2 also has a threaded opening 4 to mate the spindle nose of the particular machine to which it is desired to attach the chuck.

The center of the face plate is provided with an opening 5 into which is fitted a hardened and ground steel bushing 6 having an opening $6^a$ of a size suitable to pilot boring bars and reamers. The face plate is also provided with suitable registers so that the bushing 6 and the adapter ring will be concentric and true with each other. The face of the plate 1 opposite to that to which the adapter ring 2 is secured, is provided with a hardened and ground steel work-locating adapter 7, centrally located by a projecting register and detachably secured thereto by means of screws or other removable fastening means 8. This work-locating adapter is formed to fit the particular job upon which the machining operation is to be performed. In the present instance, it is formed to fit a radius rod strap end 9 which is to be bored, and to that end is provided with a circular recess 10 having outwardly flaring walls 11 to accurately conform to the shape of the radius rod strap end. The circular opening is cut away, as shown at 12, to permit the lugs 13 to project therethrough and form a reactional stop for torsional thrust of cut.

The lower portion of the chuck body or face plate 1 is provided with a pair of supporting members 14 which, in the present instance, are shown as pins or pillars projecting laterally through and slidable in bosses 15 integrally formed with the chuck body. These supporting members have mounted upon their outer ends a pressure plate 16, which clamps the work against the work-locating adapter 7. The pressure plate 16 is provided with a hardened and ground wear plate 17, which has an opening $17^a$ centrally located by a projecting register, with an opening $16^a$ in the pressure plate, so that a drill or reamer may pass therethrough to engage the work.

The pressure plate 16 is normally urged towards the chuck body or face plate 1 to cause the work to be maintained at all times under a positive pressure. This pressure is preferably obtained by means of a relatively strong spring 18, which is located in an opening 19 formed in the chuck body or face plate 1, and the boss 20 which protrudes therefrom. The spring is maintained within the opening 19 by the fixed cap 21 which is screw-threaded or otherwise secured to the end of the boss 20. One end of the spring bears against the fixed cap 21 and the other end bears against the flanged end 22 of the member $22^a$ which is threaded upon the bolt 23. The bolt 23 passes through an opening in the cap 21 and its outer end extends through a notch 24 in a washer 25, and is prevented from being pulled therethrough under the force of the spring by means of the head 26. The washer 25 bears against the lower end of the pressure plate 16, and the force of the spring acting against the flanged end 22 of the member $22^a$ is transmitted to the pressure plate 16 and normally urges the same toward the chuck body or face plate 1, to clamp the work between it and the work-locating adapter 7.

In order to move the pressure plate 16 away from the chuck body or face plate 1 for the insertion or removal of work, an operating shaft 27 extends through the lower portion of the chuck body 1. This shaft has each of its ends projecting beyond that portion of the chuck body 1 through which it passes. Each end of the shaft has rigidly secured thereto, by means of a pin 28, a crank 29 which is connected to one end of a link 30. The other end of the link 30 is connected to the stud 31 which is adjustably affixed in the lower portion of the pressure plate 16 by a set screw 32.

The operating shaft 27 extends beyond the cranks 29 on each side thereof, and has each of its ends 33 made angular so that a suitable wrench may be applied thereto to cause the operation of the toggle and the sliding of the pressure plate 16 and the supporting members or pins 14.

When it is desired to use the chuck it is secured to the machine tool by threading the adapter ring 2 onto the spindle nose of the machine, and a work-locating adapted 7, of suitable formation to conform to the shape of the work which is to be machined, is secured to the face plate 1 and a corresponding pressure plate is secured upon the supporting members 14. The operating shaft 33 is then turned to cause the toggles to slide the pressure plate 16 away from the face plate 1. The work is placed in the work-locating adapter 7 and the pressure plate released to clamp the work between it and the adapter ring. The force exerted by the spring 18 will cause the pressure plate 16 to clamp the work with a positive pressure;

such that the same is held rigidly in its natural position while the machining operation is being performed.

If for any reason it is desired to adapt the chuck for operating upon a different job, it is only necessary to change the work-locating adapter 7 and the pressure plate 16, and to adjust the force exerted by the spring on the bolt 23 to cause the pressure plate 16 to clamp the work with the desired force.

From the foregoing it will be seen that I have provided a positive pressure chuck which is quick acting and will hold the work in its natural position without distortion. Moreover, the pressure may, by means of set screw 32 and the threaded connection between the member 22$^a$ and the bolt 23, be adjusted through a wide range to give the desired pressure for any individual job.

In Figs. 6 and 7 I have shown a chuck which differs from the chuck just described in the manner in which the pressure plate is operated to engage and disengage the work. In this form of the invention the pressure plate 40 is operated by a fluid or air cylinder 41, which is connected with the usual piping, a pressure gage and operating valve (not shown). This cylinder is of a type well known in the art and contains a double-acting piston connected to the rod 42, which has its outer end operably connected to an advancing and retracting member 43 reciprocally mounted in a central opening 44 in the chuck body 45. The member 43 is bored to receive a hardened and ground bushing 56 which is used to pilot boring bars or reamers, and it has a shouldered recess 57 in the rear of the bushing to provide a clearance for the pilot end of the boring bar while the tool is traveling laterally through the work. The chuck body 45 of this form of the invention is, like the body 1 of the form shown in Figs. 1 to 5 inclusive, adapted to be screw-threaded onto a revolving machine tool spindle 46, which, in the instant case, is made hollow to permit the piston rod 42 to pass therethrough.

The central opening 44 of the chuck body is fitted with a hardened steel liner bushing 47. The liner 47 is cut away as at 48, to permit a pinion 49 keyed to an operating shaft 50 to pass therethrough to engage teeth 51 formed on the lower side of member 43. The operating shaft 50 extends across the chuck body 45 similar to the manner in which the shaft 27 of Fig. 1 extends across the chuck body 1, and through cranks 52, links 53 and stud 54 at each end thereof is operably connected to pressure plate 40 so that the pressure plate may be moved towards or away from the work.

The bushing 47 may also act as a register for centralizing the work-holding adapter 55. It also provides means for centralizing the hardened and ground boring bar guide bushing 56, due to the transfer register obtained by grinding the advancing and retracting member 43 to a sliding fit in bushing 47.

The advancing and retracting member 43 is preferably formed from oil-toughened steel of a different hardness from bushing 47, so that it will not seize when slidably operated in said bushing.

The operation of the form of invention shown in Figs. 6 and 7 is very similar to that already described in connection with Figs. 1 to 5 inclusive, and only differs therefrom in the manner of imparting movement to the operating shaft 50.

When air is admitted into the cylinder 41, the member 43 is caused to reciprocate in the chuck body and as it moves one way or the other the teeth 51 engaging the teeth of gear 49 keyed to shaft 50 cause the shaft to be oscillated and the pressure plate 40, through the toggle means, to be brought into engagement with the work or to be removed therefrom. It has been found that a pressure of 60 lbs. to 80 lbs. per square inch will hold the work firmly in place by means of the pressure plate. It will, of course, be understood that the operator by suitably manipulating the operating valve controlling the supply of air to the cylinder 41, can cause the piston therein, the piston rod 42 and member 43 to be moved in either direction, and that when a machining operation is being performed on the work, the control valve of fluid cylinder 41 will be set so that the pressure plate 40 is constantly urged toward the work to hold it against movement.

What I claim is:

1. A chuck comprising a body against which an article upon which work is to be performed is adapted to be clamped, means on said body for supporting said body upon the spindle of a machine tool, a plate adapted to hold said article against said body, slide means for guiding said plate, toggle means for moving said plate, said toggle means being adapted to assume a locked position to hold the plate away from the body and spring means for urging said plate toward said body.

2. A chuck comprising a body against which an article upon which work is to be performed is adapted to be clamped, means on said body for supporting said body upon the spindle of a machine tool, a plate adapted to hold said article against said body, slide means for guiding said plate and toggle means for moving said plate, said toggle means being adapted to assume a locked position to hold the plate away from the body.

3. A chuck comprising a body against which an article upon which work is to be performed is adapted to be clamped, a plate adapted to hold said article against said body, slide means supporting said plate, spring means urging said plate towards said body, the relation of the toggle means to said plate being such that when the toggle means is operated in one direction it will hold said plate away from said body.

4. A chuck comprising a body against which an irregularly shaped article upon which work is to be performed is adapted to be clamped, said body having a face of a shape which is complementary to that of one side of the article, a plate adapted to hold said article against said body, and having a face complementary in shape to the other side of said article, slide means supporting said plate, spring means urging said plate towards said body, toggle means for urging said plate away from said body, said toggle becoming locked while said plate is away from said body, a rod passing through said body and operating said toggle and means on both ends of said rod for actuating it to operate said toggle.

5. A chuck comprising a body against which an article upon which work is to be performed is adapted to be clamped, a plate adapted to hold said article against said body, means slidably connected to said plate, toggle means connecting said slidable means and said body and means adapted to clamp said slidable means to said plate, said toggle means adapted to actuate said plate and said clamping and sliding means adapted to adjust the operation of said plate through said toggle.

6. A chuck comprising a body against which an article is to be clamped, a plate adapted to hold said article against said body, toggle means for actuating said plate, a rod passing through said body and adapted to actuate said toggle means and means on both ends of said rod for operating said rod to actuate said toggle.

7. A chuck comprising a body against which an article upon which work is to be performed is adapted to be clamped, a threaded ring attached to said body for supporting said body upon the spindle of a machine tool, a face plate attached to said body and having a surface thereof formed in a shape complementary to one face of said article, a plate adapted to clamp said article to said body, said plate carrying a second face plate shaped complementary to the other side of said article, said second face plate and said plate having a central opening therethrough to permit access to the article to be worked upon, slide means connecting said plate and body, a spring urging said plate toward said body, a stub shaft slidably mounted in said plate and adapted to be clamped in position by a set screw in said plate, a shaft passing transversely through said body, a toggle connecting said shaft and stub shaft, said toggle being so formed as to assume a locked position when said plate is moved away from said body, and means on both ends of said shaft whereby said shaft may be operated to actuate said toggle from either end.

In testimony whereof I affix my signature.

RICHARD F. RUSSELL.